United States Patent [19]
Sydansk

[11] Patent Number: 5,711,376
[45] Date of Patent: Jan. 27, 1998

[54] HYDRAULIC FRACTURING PROCESS

[75] Inventor: Robert D. Sydansk, Littleton, Colo.

[73] Assignee: Marathon Oil Company, Findlay, Ohio

[21] Appl. No.: 568,872

[22] Filed: Dec. 7, 1995

[51] Int. Cl.$^6$ ............................................. E21B 43/26
[52] U.S. Cl. ............................................. 166/308
[58] Field of Search ............................. 166/250.1, 271, 166/308

[56] References Cited

U.S. PATENT DOCUMENTS

| | | | |
|---|---|---|---|
| 3,980,136 | 9/1976 | Plummer et al. | 166/280 |
| 4,044,833 | 8/1977 | Volz | 166/307 |
| 4,440,653 | 4/1984 | Briscoe et al. | 252/8.55 R |
| 4,463,810 | 8/1984 | Hill | 166/308 |
| 4,541,935 | 9/1985 | Constien et al. | 166/308 X |
| 4,579,670 | 4/1986 | Payne | 166/308 X |
| 4,779,680 | 10/1988 | Sydansk | 166/300 |
| 5,105,884 | 4/1992 | Sydansk | 166/270 |
| 5,129,457 | 7/1992 | Sydansk | 166/274 |
| 5,322,125 | 6/1994 | Sydansk | 166/295 |
| 5,346,008 | 9/1994 | Sydansk | 166/274 |
| 5,372,462 | 12/1994 | Sydansk | 405/264 |
| 5,551,516 | 9/1996 | Norman et al. | 166/308 |
| 5,566,760 | 10/1996 | Harris | 166/308 |

OTHER PUBLICATIONS

Ainley, "Development of Foam Fracturing and Cementing Fluids for Use in Tight Gas Sands," presented at AIChe, Denver, Colorado, Aug. 28-31, 1983.

Sydansk, "Polymer-Enhanced Foams Part 1: Laboratory Development and Evaluation,"SPE Advanced Technology Series, vol. 2, No. 2, Apr. 1994, pp. 150-159, SPE Paper 25168.

Sydansk, "Polymer-Enhanced Foams Part 2: Propagation Through High-Permeability Sandpacks," SPE Advanced Technology Series, vol. 2, No. 2, April, 1994, pp. 160-166, SPE Paper 25175.

*Primary Examiner*—William P. Neuder
*Attorney, Agent, or Firm*—Jack L. Hummel; Jack E. Ebel

[57] ABSTRACT

A process for fracturing a subterranean formation below an earthen surface in fluid communication with a wellbore. A foamed fracturing fluid comprising an aqueous solvent, a water-soluble synthetic polymer, a surfactant, and a gas is premixed at the surface. The aqueous solvent may be a fresh water or a brine. The fracturing fluid may additionally comprise a proppant, fluid loss additive, and/or a foam breaker. After the fluid is mixed and foamed, it is injected into the formation via the wellbore at a pressure sufficient to induce at least one hydraulic fracture in the formation.

29 Claims, 12 Drawing Sheets

HYDRAULIC FRACTURING PROCESS

BACKGROUND OF INVENTION

1. Technical Field:

The invention relates to a process for hydraulically fracturing a subterranean formation, such as a hydrocarbon-bearing formation, and more particularly, to such a process for fracturing the formation with a polymer enhanced foam.

2. Description of Related Art:

The productivity or injectivity of a well bore in fluid communication with a subterranean hydrocarbon-bearing formation may be undesirably low due to a number of causes, including low permeability of the formation rock, plugging by previously injected materials, clay damage, scale damage, asphaltene damage, or other produced fluid damage. Productivity or injectivity may be increased by hydraulically fracturing the formation.

Hydraulic fracturing generally entails injecting a fluid into the well bore at a sufficient rate and pressure to part or open existing fractures and/or overcome the tensile strength of the formation and, in the case of shallow, horizontal fractures, the formation overburden pressure. The injected fluid creates cracks or fractures extending from the well bore out into the formation which are often propped open with a solid proppant entrained in the fluid. The fractures permit hydrocarbons and other fluids to flow more freely into or out of the well bore. Accordingly, desirable physical and chemical properties of a fracturing fluid are listed below. A fracturing fluid should be compatible with the reservoir rock and reservoir fluids, have sufficient viscosity and structure to suspend proppants and transport them deep into the formation, be stable enough so as to retain sufficient viscosity and structure throughout proppant placement, possess low fluid losses properties, be easily removed from the formation, possess low fluid flow friction pressures, be easily made under field conditions, and be relatively inexpensive. Successful placement of proppant material in the newly created fractures is enhanced by the use of specialized fracturing fluids which exhibit high levels of rheological performance.

Foam has recently been utilized as a fluid for fracturing a subterranean formation. Fracturing fluids, such as foams, which contain a significant quantity of gas are desirable because the gas aids in cleanup after the hydraulic fracturing process has been completed. The gas "energizes" the fluid, and when the pressure is decreased, such as by producing fluids from the well, the gas expands and drives much of the liquid component of the fracturing fluid out of the fracture and any part of the adjacent formation which the fluid has penetrated. Foams are also desirable because they have a low liquid content compared to conventional fracturing fluids. If aqueous fluids invade the adjacent formation, they can decrease permeability by reacting with clays and causing formation damage or by interfering with gas and/or oil flow into the wellbore due to relative permeability effects. In addition, foam fracturing fluids have a lower unit volume cost than conventional fracturing fluids due to the low cost of the gas. However, the use of conventional foams as fracturing fluids has proven to be unsatisfactory due to the low effective viscosities and the poor stability, particularly in the presence of oil, of such foams. The low effective viscosity and structure of such foams has greatly limited the ability of the foam to entrain and successfully transport high concentrations of proppant to and into cracks or fractures extending from the wellbore. Conventional foams also tend to have poor leakoff properties due to their low viscosities.

Thus, a need exists for a fracturing fluid which exhibits all the characteristics of a successful fracturing fluid but is more stable and has a higher effective viscosity and increased structure to transport a high concentration of proppant and provide more favorable leakoff properties.

SUMMARY OF THE INVENTION

To achieve the foregoing and other objects, and in accordance with the purposes of the present invention, as embodied and broadly described herein, the present invention is characterized as a process for parting and/or fracturing a subterranean formation below an earthen surface in fluid communication with a wellbore. A foamed fracturing fluid comprising an aqueous solvent, a water-soluble polymer, a surfactant, and a gas is premixed at the surface. The aqueous solvent may be a fresh water or a brine, and the gas may be nitrogen, air, carbon dioxide, flue gas, produced gas, natural gas, or a mixture thereof. The fracturing fluid may additionally comprise a proppant and/or a foam breaker, but should be substantially free of any agents which can crosslink the polymer. After the fluid is mixed, it is injected into the formation via the wellbore at a pressure sufficient to induce at least one hydraulic fracture in the formation.

BRIEF DESCRIPTION OF THE DRAWINGS

The accompanying drawings, which are incorporated herein and form a part of the specification, illustrate the embodiments of the present invention and, together with the description, serve to explain the principles of the invention.

In the drawings.

DESCRIPTION OF THE PREFERRED EMBODIMENTS

Figure 1A:
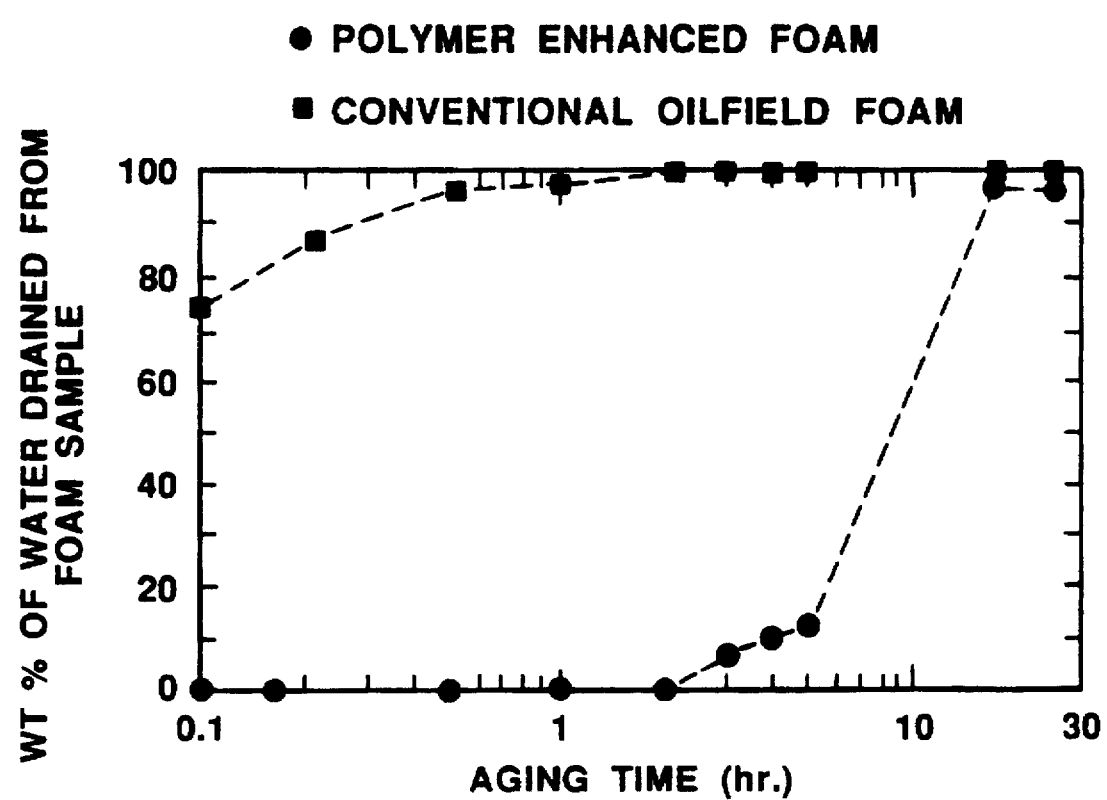
FIG. 1A is a graph showing the weight per cent of water drained from polymer-enhanced and conventional foam samples as a function of foam aging time in a graduated cylinder.

A number of specific terms are used throughout the specification to describe the process of the present invention and are defined as follows. Hydraulic fractures are fractures or cracks which are introduced into a subterranean formation by injecting a fluid into the formation at a pressure greater than the parting or fracture pressure of the formation. Generally, hydraulic fractures have a substantially vertical orientation at depths greater than about 350 meters, and the parting or fracture pressure is the pressure at which open fractures are created, either by opening existing closed fractures or exceeding the rock tensile stress. However, in shallow formations, fractures may be substantially horizontal, and the parting pressure may be the overburden pressure or the sum of the overburden pressure and the tensile stress of the formation. "Well" and "wellbore" are used interchangeably to denote a borehole extending from the earth surface to a subterranean formation and at least partially in fluid communication with a subterranean formation. A "production wellbore" enables the removal of fluids from the formation to the surface and an "injection wellbore" enables the placement of fluid into the formation from the surface. Although termed a "production wellbore" throughout the description, it is understood that pursuant to the present process the production wellbore may temporarily have an injection function for placement of the foam of the present invention in the formation. The production wellbore is, however, restored to its hydrocarbon production function upon the completion of foam placement. In contrast, an "injection wellbore" as termed herein, is substantially limited to an injection function. "Fluid" is inclusive of a gas, a liquid, and/or mixtures thereof.

A "foam" is a stabilized gas dispersion maintained within a liquid phase, wherein a plurality of gas bubbles are separated from one another by interfacially stabilized films of liquid. The dispersed gas phase generally constitutes at least thirty percent of the total volume of the foam. "Foam quality" denotes the volume percentage of the gas phase in a given foam at a specified pressure and temperature. Conventional oilfield foam fracturing fluids consist of a gas dispersed in a surfactant solution made up of a surfactant and a solvent, along with other additives known to those skilled in the art. The surfactant acts as a foaming agent to facilitate and stabilize the gas dispersion within the liquid phase. A "polymer enhanced foam" is a specific type of oilfield foam comprising a gas dispersed in an aqueous surfactant solution, wherein the aqueous surfactant solution further includes a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter. Both conventional and polymer enhanced foams have densities significantly lower than the liquids from which they are formed.

The present invention can be employed to enhance the recovery and/or rate of recovery of fluids from most subterranean formations into which hydraulic fractures are to be induced. It is particularly suited to enhancing the recovery of liquid and gaseous hydrocarbons from subterranean hydrocarbon-bearing formations. The process of the present invention is performed by injecting a polymer enhanced foam into a subterranean formation penetrated by a production or injection wellbore at a pressure sufficient to induce one or more hydraulic fractures in the formation. The polymer enhanced foam is generated from a substantially uncrosslinked water-soluble polymer, an aqueous solvent, a surfactant, and a gas. For the purposes of this description, "water-soluble" means that the polymer is capable of being dissolved or suspended in an aqueous liquid. It is important to note that the foam composition is substantially free of any polymer crosslinking agent which could otherwise crosslink the polymer and convert the liquid phase of the foam to a crosslinked polymer gel at some point in the process. Polymers satisfying the criteria set forth below impart greater viscosity, structure, and stability to the polymer enhanced foam of the present invention relative to conventional oilfield foams formulated from a gas and a liquid phase containing a surfactant, but lacking polymer enhancement. The polymers also function as a drag reduction agent and reduce friction loss when the fluid is pumped through the wellbore tubulars. A proppant may be mixed with the polymer enhanced foam. Optionally, a breaker, a solid fluid loss material, and/or other fracturing fluid additives known to those skilled in the art may also be mixed with the foam. The polymer enhanced foam of the present invention is not highly sensitive to any particular formation mineralogy or lithology. The gas, surfactant, and polymer resulting from foam breakdown in the fractures can be enhanced oil recovery agents which are beneficial and not deleterious to the recovery of liquid hydrocarbons and fracturing fluids from the formation and the newly formed hydraulic fractures by produced reservoir fluids or by a subsequently injected drive fluid, if desired.

The viscosity and structure of a fracturing fluid determine the quantity of proppant the fluid can carry and retain in suspension. It is desirable that a fracturing fluid have a high viscosity and a high degree of structure to maximize the quantity of proppant that can be delivered into hydraulic fractures and to help prevent the proppant from settling to the bottom of the fractures and the wellbore during emplacement. However, it is difficult to pump viscous fluids. It is also desirable that a fracturing fluid have desirable friction loss properties that aid in pumping the fluid. The polymer enhanced foam fracturing fluid of the present invention possesses a high viscosity under low shear conditions, but is highly shear thinning; the fluid viscosity decreases rapidly when the fluid is subjected to shear forces, and increases rapidly when the shear forces are no longer present. Thus, the fluid can be pumped relatively easily into a well and through perforations under high shear conditions to create fractures, but is highly viscous as it travels through the wellbore and the fracture under low shear conditions, thereby better retaining the proppant in suspension. The foam is also self healing, so that it is capable of reforming itself as it flows through the perforations and constrictions that may be present in the fracture. Ideally, a fracturing fluid should also have a low leakoff rate. Increasing the structure in the fluid helps prevent leakoff, and increasing the viscosity decreases the leakoff rate. The width of a hydraulic fracture while the fracture fluid is pumped into the fracture depends in part upon the leakoff rate of the fluid and the pressure which is applied to the formation. High viscosity and highly structured fluids tend to have low leakoff rates, and therefore, facilitate the creation of wider hydraulic fractures.

Polymer enhancement of the foam also advantageously increases the structural strength and critical pressure gradient for flow of the foam relative to conventional polymer-free foams. The term "strength" refers to the resistance of a foam to deformation and/or collapse when pressure or force is applied to the foam, and the "critical pressure gradient for flow" is defined herein as the maximum pressure that can be applied to the foam without foam flow. The critical pressure gradient for foam flow, or the pressure which must be applied to a foam to make it flow, is less than or equal to the critical pressure gradient for foam formation. A significant degree of structure in the fracturing fluid, evidenced by a large critical pressure for gradient flow, also enhances the fluid's ability to suspend the proppant and resist leakoff. Increased foam strength and structure also enhance the fracture width during the fracturing operation, enabling placement of more proppant in the fracture.

Polymer enhanced foam also exhibit relatively large drag reduction and low friction loss as they are pumped through wellbore tubulars. The reduction in friction at the tubular walls results from a low apparent viscosity at the tubular wall relative to the bulk viscosity of the foam. The friction loss properties allow the foams to be pumped into the well and formation at lower pressure and/or higher rates. Such friction loss properties reduce the energy requirements for pumping.

Foams can break down and/or lose strength by losing some of the liquid film while retaining the bubble structure and volume, by gas diffusion between bubbles and/or out of the foam, and by rupture of the film separating the gas bubbles. It is desirable that the foam fracture fluid has a lifetime which is long enough to complete a hydraulic fracturing operation, which may take several hours or longer. The polymer enhanced foam of the present invention is relatively stable to gravity drainage of water over a wide range of temperatures, pressures, formation water salinities, and water hardnesses. It retains its structure over a significant lifetime, up to six hours or longer, without separating into gas and aqueous phases or losing a substantial amount of water. However, the polymer enhanced foam breaks down within a predetermined period of time to a gas and an aqueous solution containing a surfactant and a polymer in order to permit removal thereof from the fractures and, possibly, the adjacent formation, by producing fluids. Thus, the fracture conductivity for produced or injected fluids after the fracturing treatment is maximized. The stability of the polymer enhanced foam of the present invention can be predetermined by varying the surfactant chemistry and composition and concentration, the polymer chemistry and concentration, the brine chemistry, and the foam quality. In particular, the stability is often highly sensitive to the polymer concentration.

A distinguishing feature of the polymer enhanced foam of the present invention is its ability to retain its structure when contacted by liquid hydrocarbons within the formation. In contrast, conventional polymer-free foams collapse much more rapidly and are readily destabilized and collapse upon contact with hydrocarbons, particularly oil.

The polymer employed in the polymer enhanced foam of the present invention may be any relatively high molecular weight water-soluble, viscosity-enhancing synthetic polymer or biopolymer. Biopolymers useful in the present invention include polysaccharides and modified polysaccharides, such as xanthan gum, guar gum, succinoglycan, sclerogliycan, polyvinylsaccharides, carboxymethylcellulose, o-carboxychitosans, hydroxyethylcellulose, hydroxypropylcellulose, and modified starches. Useful synthetic polymers include polyacrylamide; partially hydrolyzed polyacrylamide; acrylamide copolymers; acrylamide terpolymers containing acrylamide, a second species, and a third species; tetrapolymers containing acrylamide, acrylate, a third species, and a fourth species; polyvinyl alcohol; polyethylene oxide; and polyvinyl pyrrolidone. Polyacrylamide (PA) is defined as an acrylamide polymer having substantially less than about 1% of its acrylamide groups in the form of carboxylate groups. Partially hydrolyzed polyacrylamide (PHPA) is an acrylamide polymer having more than about 1%, but not 100%, of its acrylamide groups converted to the form of carboxylate groups. PA and PHPA are the preferred polymers. Useful acrylamide polymers are prepared according to any conventional method, but preferably have the specific properties of an acrylamide polymer prepared according to the method disclosed in U.S. Pat. No. Re. 32,114, incorporated herein by reference.

The average molecular weight of an acrylamide polymer employed in a polymer enhanced foam in accordance with the present invention is in the range of about 10,000 and about 50,000,000, preferably between about 250,000 and about 20,000,000, and most preferably between about 1,000,000 and about 18,000,000. The polymer concentration in the polymer enhanced foam of the present invention is from about 100 ppm to about 80,000 ppm, preferably from about 500 ppm to about 12,000 ppm, and most preferably from about 2,000 ppm to about 10,000 ppm.

The aqueous solvent of the present polymer enhanced foam is substantially any aqueous liquid capable of forming a solution with the selected polymer. The term "solution" as used herein, in addition to true solutions, is intended to broadly encompass dispersions, emulsions, or any other homogeneous mixture of the polymer in the aqueous solvent. The solvent is preferably either a fresh water or a brine, such as a produced water from the subterranean formation. Produced water can be advantageous because of its low cost and ready availability and because it enables the practitioner to return produced water to the formation, thereby eliminating disposal thereof.

The surfactant of the polymer enhanced foam is substantially any water-soluble foaming agent suitable for oilfield use that is compatible with the specific polymer selected, as will be evident to the skilled artisan. As such, the surfactant can be anionic, cationic, or nonionic. A preferred surfactant is selected from the group consisting of ethoxylated alcohols, ethoxylated sulfates, refined sulfonates, petroleum sulfonates, and alpha olefin sulfonates. The concentration of surfactant in the liquid phase of the foam is in a range between about 20 ppm and about 50,000 ppm, preferably between about 50 ppm and about 20,000 ppm, and most preferably at least about 1,000 ppm. In general, the performance of the polymer enhanced foam in the method of the present invention is relatively insensitive to the particular species and concentration of the surfactant selected, subject to the above-recited criteria, particularly when the selected polymer is an acrylamide polymer.

Virtually any gas can be employed in the present polymer enhanced foam to the extent the gas is substantially chemically inert with respect to the other foam components and with respect to wellbore production or injection equipment with which the foam comes into significant contact. Because the fracturing fluid of the present invention possesses low fluid loss properties, contact between the liquids of the fracturing fluid and formation rock and fluids is generally minimal, and problems of compatibility within the formation are generally less than with other fracturing fluids. A preferred gas is one which is readily available in the field. Such gases include nitrogen, air, carbon dioxide, flue gas, produced gas, and natural gas. Nitrogen and carbon dioxide are often preferred because they are readily available and safe and easy to handle. The foam quality of the polymer enhanced foam product, i.e., the volume percentage of gas in the foam at a specified pressure and temperature, is typically within a range from about 30% to about 99% at reservoir pressure and temperature, more preferably within a range from about 60% to about 98%, and most preferably within a range from about 70% to about 97%. As is apparent to those skilled in the art, the foam quality varies with pressure and temperature.

It should be noted that some gases, particularly $CO_2$, may become liquids or supercritical fluids under reservoir temperature and pressure conditions. In either case, the foam may become a high viscosity emulsion and retain its ability to carry the proppant. $CO_2$ emulsions have significantly lower densities than water. An emulsion can be used in many situations where it is desirable to use a low density fracturing fluid. Like foams, such emulsions expand with decreasing pressure and are energized fluids.

Foam generation requires mixing the liquid phase and the gas either at a high velocity or through a small orifice as can be provided by any conventional foam generator. The liquid phase is preferably preformulated by dissolving the surfactant and polymer in the aqueous solvent prior to foam generation. The foam is then generated by any method known to those skilled in the art. For example, the foam may be generated at the earthen surface by passing the liquid phase and gas through a foam generator. The foam may then be mixed with a proppant, and the mixture is delivered to a production or injection wellbore for injection therein. Any proppant known to those skilled in the art and chemically compatible with the fluid components may be utilized. Alternatively, the foam may be generated at the surface by coinjecting the gas and the liquid into the wellbore across a surface injection tee acting as a foam generator. It is preferred that the proppant be added to the foam prior to or at the same time as the foam's entry into the well to ensure complete mixing. Optionally, a breaker, a solid fluid loss material, and/or other additives can be incorporated into the mixture, such as by mixing with the aqueous solution or with the foam.

The pH of the liquid phase in the polymer enhanced foam is generally within a range of about 4 to about 10, and preferably within a nearly neutral range of about 6 to about 8. In most cases, the pH of the liquid phase inherently falls within the above-recited range without any pH adjustment thereof. However, should the pH of the liquid phase be outside the desired range, the pH can be adjusted during foam generation in accordance with conventional oilfield procedures to achieve a desired pH range. The pH adjustment can be made in any manner known to the skilled artisan. Nevertheless, it has been found that the present process is relatively insensitive to the pH of the liquid phase.

In general, the polymer enhanced foam of the present invention should have a significant degree of structure. The viscosity and degree of structure of the polymer enhanced foam formulated in the manner of the present invention are primarily functions of the polymer properties and polymer concentration. In general, the viscosity and degree of structure of a polymer enhanced foam containing an acrylamide polymer are increased by increasing the polymer concentration of the liquid phase. However, a more cost-effective and often preferred means for achieving the same effect is to employ a higher molecular weight polymer or, in some cases, a polymer having a higher degree of hydrolysis at a relatively fixed concentration. Conversely, a reduction in viscosity and the degree of structure is achieved by using a lower molecular weight polymer, a lower polymer concentration, or, in some cases, a polymer having a lower degree of hydrolysis. Thus, the skilled practitioner can modify the viscosity and the degree of structure of the present polymer enhanced foam in the above-described manner to correspond with the size and extent of the fractures to be induced into a given hydrocarbon reservoir.

Because the foam of the present invention can be designed to break down after a predetermined time which is sufficiently short to be practical for establishing or returning the well to production or injection functions, a breaker is generally not needed. Nevertheless, if desired, a conventional breaker can be incorporated into the foam or, possibly, injected separately after foam injection to degrade the foam and/or polymer in situ in the fracture or fractures.

The "energized" nature of the foam aids in its cleanup and removal from the fracture and/or the formation. If some invasion of the foam into the formation should happen to occur, a reduction in pressure after the hydraulic fracturing operation in a production well due to normal production operations causes the gas bubbles in the foam to expand and push a portion of the foam out of the formation and/or the propped fractures. When the foam eventually breaks down, the gas, surfactant, and polymer resulting from foam breakdown may enhance fluid flow between the formation, the fractures, and the well; the gases, surfactants, and polymers of the polymer enhanced foam are similar to those commonly used as enhanced recovery agents.

Placement of the polymer enhanced foam fracturing fluid in the subterranean formation encompasses injection of the foam into the formation via a production or injection wellbore penetrating the formation and in fluid communication with the liquid production wellbore. The polymer enhanced foam fracturing fluid is injected into a subterranean formation via the well bore under a pressure greater than the parting or fracture pressure of the formation. As is apparent to one skilled in the art, the volume of foam injected for a given fracture size and volume is determined on the basis of the requirements for the particular well and formation into which it is to be injected.

Placement and performance of the polymer enhanced fracturing fluid is facilitated by the relatively high shear thinning properties of the polymer enhanced foam. The polymer enhanced foam exhibits relatively high viscosities and structure in the wellbore and when placed in the fracture or fractures substantially beyond the injection point, but exhibits relatively low effective viscosities under the high flow rate, high pressure gradient for flow, and high shear rate conditions encountered at the injection point, perforations, or wellbore exit point during the injection step due to the ability of the foam to highly shear thin. Thus, the high shear thinning ability of the foam results in relatively good injectivity of the foam into the fracture with a minimum of injectivity reduction and relatively low energy consumption. The good friction loss properties of the polymer enhanced foam, particularly in tubulars, also improve injectivity and decrease the energy consumption. Nevertheless, once the polymer enhanced foam is successfully placed in the fracture or fractures, it beneficially shear thickens under the low shear conditions in the wellbore and within the fracture, thereby achieving a sufficient and more desirable degree of structure and proppant carrying capacity. The relatively high degree structure and viscosity also prevent excessive leakoff and settling of the proppant to the bottom of the fracture or fractures.

The following examples demonstrate the practice and utility of the present invention, but are not to be construed as limiting the scope thereof. In all of the examples, foams are generated by coinjecting a foam-forming solution and a gas into a high permeability foam generating sand pack. All experiments are conducted at room temperature unless otherwise noted. The foam forms within about the first 2.5 cm of the sand pack and then advances through the rest of the sand pack. Thus, the sand pack may function as a foam generating device, as a model of a propped fracture, or both simultaneously. In each of the following examples, if a single sand pack is utilized, it performs both functions, and if two sand packs are utilized, the first sand pack is for foam generation and the second is a test sand pack serving as a model of a propped fracture. Foam properties, such as average apparent viscosity, are determined from data obtained for the foam in the sand pack, based on the entire length of the sand pack. Properties of bulk foam samples are similar to those observed in sand packs.

EXAMPLE 1

Polymer enhanced foam stability in glassware

Conventional and polymer enhanced foams are prepared to compare their stability and, in particular, the resistance to physical foam collapse and water drainage under the influence of gravity. One of the conventional foams and the polymer enhanced foam are substantially identical in composition except for the presence of an unhydrolyzed polyacrylamide at a concentration of 7,000 ppm in the aqueous phase of the polymer enhanced foam. The molecular weight of the polymer is 11,000,000. The liquid phase of both foams is made up of a fresh water solvent containing 1,000 ppm of an ethoxylated sulfate surfactant marketed commercially by Shell Chemical Co., Enhanced Oil Recovery Chemicals, P.O. Box 2463, Houston, Tex. 77001, (713) 241-2592, as Enordet 1215-3S. The surfactant has the formula $C_{12-15}$—$EO_3$—$SO_4Na$. A second conventional foam is prepared with the same solvent and 5,000 ppm of Enordet 1215-3S surfactant in the aqueous phase.

The foam samples am generated by coinjecting the liquid phase and $N_2$ gas into a foam generating sand pack. The sand pack has a permeability of 67 darcies, a length of 30 cm and a diameter of 1.1 cm. All flooding is conducted at 170 kPa constant differential pressure across the sand pack and atmospheric backpressure. The polymer enhanced foam propagates at a frontal advance rate of 207 m/day and exhibits an average apparent effective viscosity within the sand pack of 89 cp, while the first conventional foam propagates at a frontal advance rate of 8230 m/day and exhibits an average apparent effective viscosity of only 2 cp at the same differential pressure. Thus, the polymer enhanced foam has a substantially larger effective viscosity than the counterpart conventional foam.

Figure 1B:
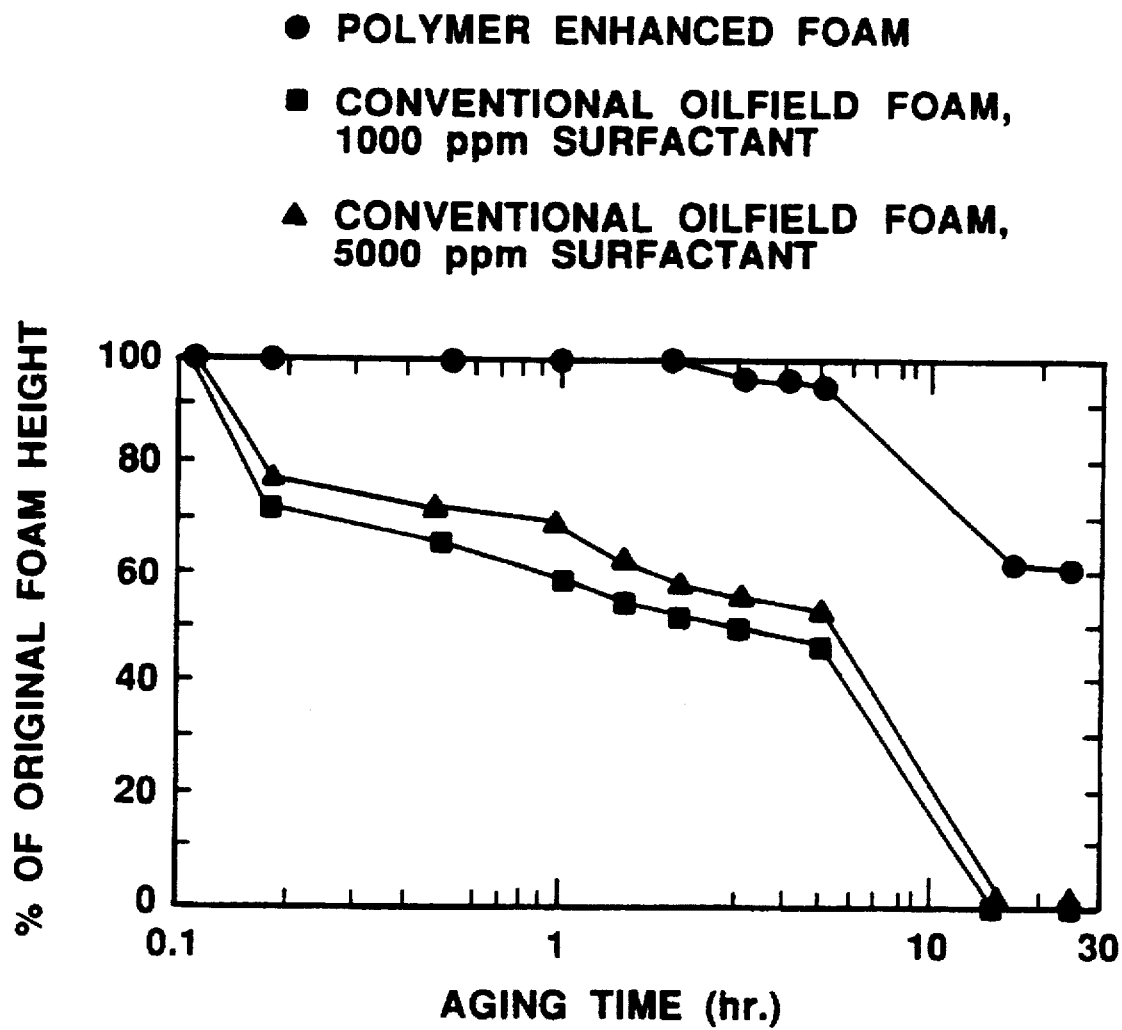
FIG. 1B is a graph showing the percentage of original foam height as a function of aging time for the foam samples of FIG. 1A and an additional conventional foam sample.

A 100 cm³ sample of each foam is collected as effluent from the sand pack and placed in a stoppered graduated cylinder for aging at ambient temperature. The positions of the foam/water and foam/air interfaces in the graduated cylinders are measured as a function of time to determine the rates of water drainage and foam collapse, respectively for each of the samples. The results are shown in FIGS. 1A and 1B, respectively. It is apparent therein that the rates of water drainage and foam collapse are much greater for the conventional polymer-free foam than the polymer enhanced foam. A 100 cm³ fine-textured sample of the 5,000 ppm surfactant conventional foam is also obtained in the same manner. The results are highly comparable to the conventional foam sample with 1,000 ppm surfactant, as shown in FIG. 1B. Thus, this example shows that the polymer enhanced foam is more stable with respect to water drainage and foam collapse under the influence of gravity than the conventional polymer-free foam.

Further, increasing the surfactant concentration increases the stability of the conventional foam slightly, but the effect is much smaller than the effect of adding polymer to the aqueous solution. This example demonstrates that adding a relatively small amount of polymer to a conventional foam increases the foam stability significantly mere than adding additional surfactant. Thus, significant cost savings and improved performance can be achieved by adding a polymer to a foam rather than increasing the surfactant concentration. The stability of a polymer enhanced foam is often greater in a porous medium, such as a propped fracture, than in laboratory glassware.

EXAMPLE 2

Rheometer viscosity

Figure 2:
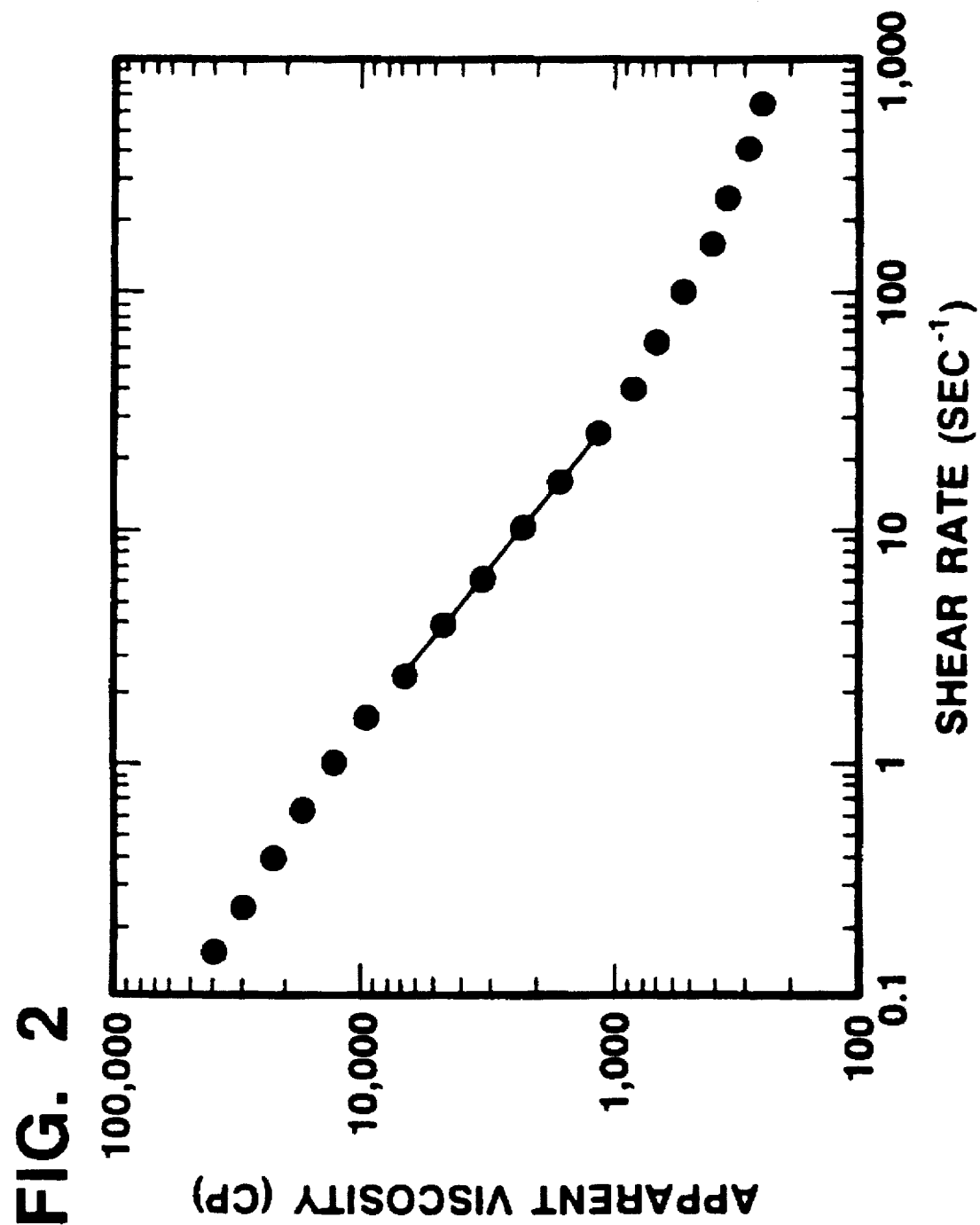
FIG. 2 is a graph of the apparent viscosity of a bulk sample of a polymer enhanced foam of the present invention as a function of the shear rate.

A polymer enhanced foam is prepared in a foam generating sand pack by combining $N_2$ gas with a solution of a produced reservoir brine containing 7,000 ppm PHPA and 2,000 ppm of Stepanflo 20, a $C_{14-16}$ alpha olefin sulfonate surfactant marketed by Stepan Chemical Company, 22 Frontage Road, Northfield, Ill. 60093. The brine contains 5,800 ppm total dissolved solids and has principle constituents in the following concentrations: 560 ppm $Ca^{++}$, 160 ppm $Mg^{++}$, 1,500 ppm $Na^+$, 200 ppm $K^+$, 2,200 ppm $SO_4^{-2}$, and 1,400 $Cl^-$. The PHPA is 30 per cent hydrolyzed and has a molecular weight of 11,000,000, and the foam quality is 88 per cent as produced. The foam is aged for five minutes, and viscosity measurements are then made on the bulk foam in a Rheometrics RFS rheometer using the steady shear-rate mode. Shear rates from 0.15 to 700 $sec^{-1}$ are studied. The polymer enhanced foam is a shear-thinning fluid over the entire range of shear rates. The minimum measured viscosity is 250 cp, and the maximum viscosity is over 40,000 cp. The power-law viscosity values ($\eta$) are determined to be N=0.24 and K=13,000 cp over the linear range of data obtained, where $\eta = K(y)^{N-1}$ and y is the shear rate in units of $sec^{-1}$. The results are shown in FIG. 2, with the power law curve fit shown as a solid line. The polymer enhanced foam exhibits substantial shear-thinning viscosity behavior, indicating that the foam would have high injectivity in high shear rate environments, such as at the site of injection into the formation, but would also have good proppant transport capabilities and decreased proppant settling rates in low shear rate environments, such as the wellbore and hydraulic fractures.

A conventional foam is also prepared without the surfactant, and it is so unstable that is not readily feasible to obtain similar measurements.

This example shows that the bulk polymer enhanced foam is highly shear thinning and that very large effective viscosities can be attained at low shear rates. The rheological behavior of the bulk polymer enhanced foam is similar to that observed for the foam in porous media.

EXAMPLE 3

Critical pressure gradient for flow

Polymer enhanced and conventional foams are prepared using Denver, Col., U.S.A., tap water, 2,000 ppm in the aqueous phase of Bio-Terge AS-40, a $C_{14-16}$ alpha olefin sulfonate surfactant obtained from Stepan Chemical Company, 22 Frontage Road, Northfield, Ill. 60093, and $N_2$. The polymer enhanced foam also contains 7,000 ppm in the aqueous phase of 30 per cent hydrolyzed PHPA with a molecular weight of 11,000,000. The tap water contains 30 ppm of C as $CO_3^{-2}$, 78 ppm of $Ca^{++}$, 18 ppm of $Mg^{++}$, 130 ppm $Na^+$, 25 ppm of $Cl^-$, and 250 ppm of total dissolved solids. The critical pressure gradient for foam flow is determined for the polymer enhanced foam in a sand pack having a permeability of 140 darcies and a length of 30 cm. The sand pack is used in this case as a model of a propped fracture. Flooding experiments are conducted at atmospheric backpressure and at 3100 kPa backpressure for foam qualities between 57 and 93 per cent. The critical pressure gradient for foam flow of the polymer enhanced foam is in the range of 452 to 678 kPa/m. The critical pressure gradient for foam flow for a conventional foam having the same composition but without the polymer is 136 to 158 kPa/m. The higher critical pressure gradient of the polymer enhanced foam indicates that the polymer enhanced foam has significantly more structure, better proppant carrying ability, and less leakoff tendency than the conventional foam.

The critical pressure gradient for foam flow is also determined for the polymer enhanced foam flowing through a 1.45 mm ID tube. The tube is used as a model of narrow tubing. The critical pressure gradient for flow is less than 2 kPa/m, indicating that the foam has a negligible yield strength and yield pressure as it passes through the tube. Thus, the foam should flow readily through wellbore tubulars and be easy to pump through well tubulars.

This example illustrates that the polymer enhanced foam of the present invention has a greater critical differential pressure gradient for foam flow, yield pressure, yield strength, and structure than its counterpart conventional foam. Thus, the polymer enhanced foam has better proppant carrying ability and leakoff properties than conventional foams. Moreover, the polymer enhanced foam has a negligible yield strength and yield pressure as it flows through pipes and tubulars.

EXAMPLE 4

Viscosity as function of foam quality

A sample of a polymer enhanced foam and a sample of a conventional polymer-free foam that is substantially identical in composition to the polymer enhanced foam except for the absence of a polymer component are prepared to compare the effective viscosities of the two foams as a function of foam quality. Both foams are formulated from $N_2$ and a brine solvent having a $C_{114-16}$ alpha olefin sulfonate surfactant dissolved therein at a concentration of 2,000 ppm. The brine contains 5,800 ppm total dissolved solids and has principle constituents in the following concentrations: 560 ppm $Ca^{++}$, 160 ppm $Mg^{++}$, 1,500 ppm $Na^+$, 200 ppm $K^+$, 2,200 ppm $SO_4^{-2}$, and 1,400 $Cl^-$. The aqueous phase of the polymer enhanced foam additionally contains a partially hydrolyzed polyacrylamide at a concentration of 7,000 ppm. The partially hydrolyzed polyacrylamide has a molecular weight of 11,000,000 and is 30% hydrolyzed.

A sand pack substantially the same as that of Example 2 is flooded with each foam over a range of foam qualities. A first polymer enhanced foam sample is flooded at a backpressure of 1,725 kPa and a differential pressure of 345 kPa. The first sample propagates at an apparent frontal advance rate of between about 158–198 m/day. A second polymer enhanced foam sample is flooded at a backpressure of 3,100 kPa and a differential pressure of 345 kPa, and the apparent frontal advance rate is between 146 and 213 m/day. The conventional foam sample is flooded at atmospheric backpressure and a differential pressure of 138 kPa and propagates at a frontal advance rate of between about 335 and 1,463 m/day.

Figure 3:
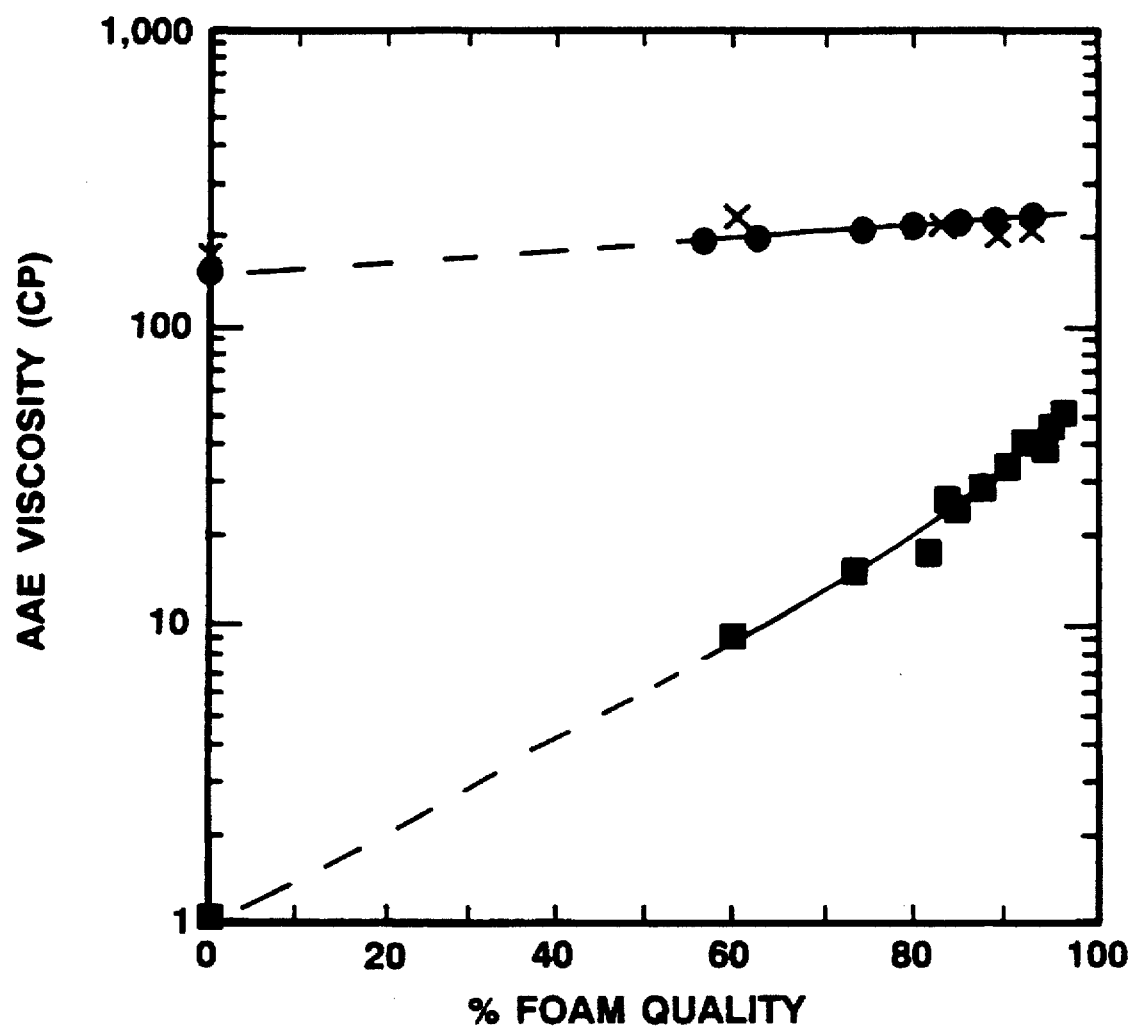
FIG. 3 is a graph of the average apparent effective viscosity in a sand pack as a function of foam quality for conventional and polymer enhanced foams.

The results are set forth in FIG. 3 and indicate that the sensitivity of the average apparent viscosity of the polymer enhanced foam to foam quality is much less than that for the counterpart conventional foam. Furthermore, the effective viscosity of the polymer enhanced foam at any given foam quality is much greater than that of the conventional foam. In FIG. 3, "PEF" refers to polymer enhanced foam, and "BP" refers to backpressure.

EXAMPLE 5

Frontal advance rate of polymer enhanced foam and polymer solution

A polymer enhanced solution is prepared, also using a reservoir brine and the same surfactant and polymer as in Examples 3 and 4. The solution contains 2,000 ppm surfactant and 7,000 ppm of PHPA. A portion of the solution and then another portion of the solution and $N_2$ gas are injected into a 170 darcy sand pack at atmospheric backpressure and 22° C., with a constant pressure drop between 138 and 1,380 kPa. The sand pack is 30 cm long and has an inner diameter of 1.1 cm. The resulting foam qualities range from 77 to 89 per cent.

Figure 4:
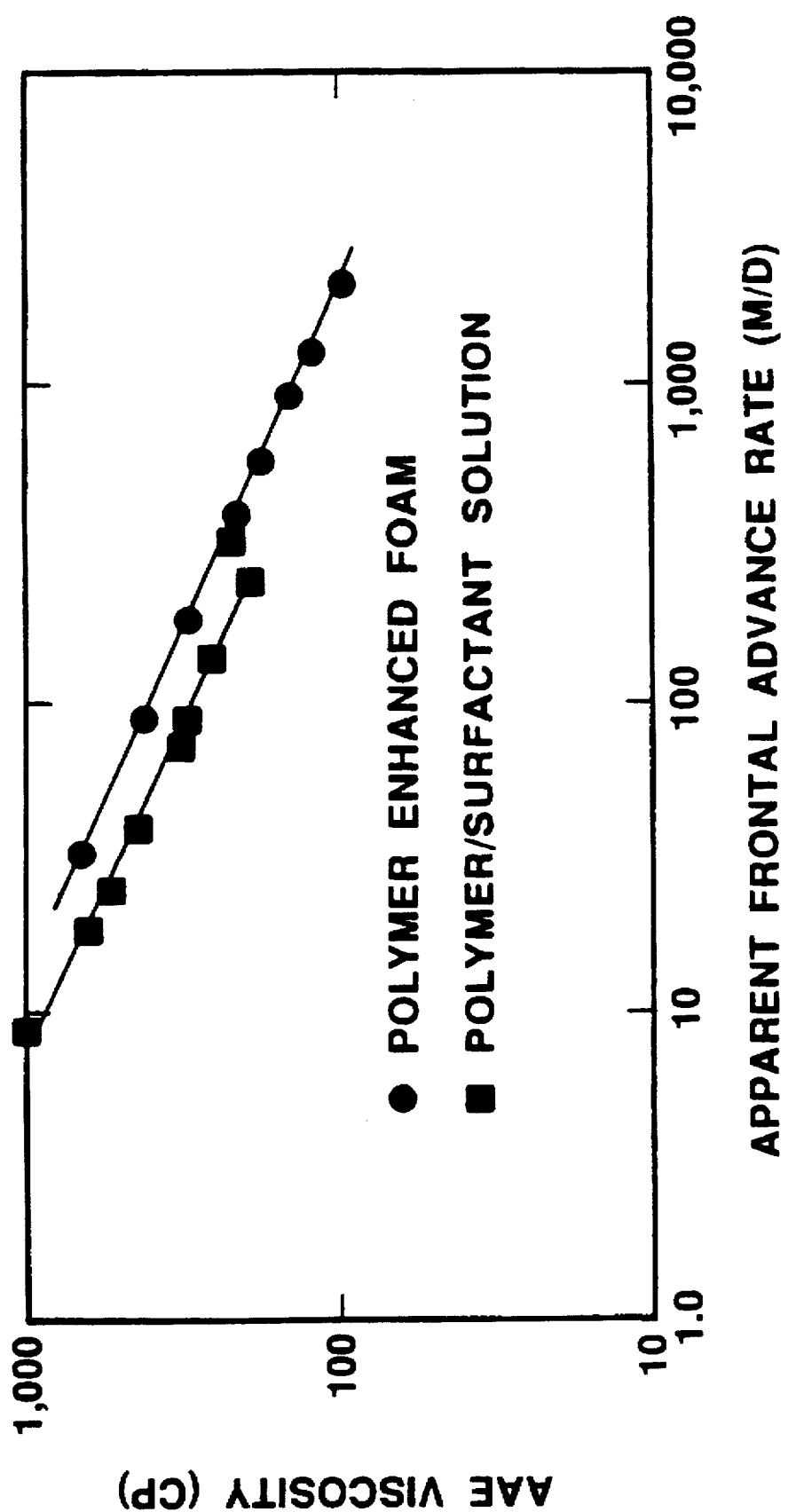
FIG. 4 is a graph of the average apparent effective viscosity in a sand pack as a function of the apparent frontal advance rate for a polymer-surfactant solution and for a polymer enhanced foam generated from the same solution.

FIG. 4 shows the apparent average effective viscosity (AAE) of the aqueous polymer solution and polymer enhanced foams as a function of the apparent frontal advance rate. The polymer enhanced foam is a shear thinning fluid, and the viscosity behavior conforms to the power-law model over the range of frontal advance rates and shear rates studied. The viscosity and shear thinning properties of the polymer enhanced foam mirror the viscosity and shear thinning properties of the polymer solution. Further, the viscosity of the polymer enhanced foam is very similar to the viscosity of the polymer solution. Thus, the quantity of polymer can be significantly reduced by using a foam rather than a polymer solution, resulting in similar rheological performance with a significant decrease in the cost of the polymer and polymer solution used in a hydraulic fracturing process.

EXAMPLE 6

Effects of pressure on frontal advance rate and effective viscosity

Polymer enhanced foams are prepared using a solution of 2,000 ppm surfactant and 7,000 ppm of PHPA with a molecular weight of 11,000,000 in a reservoir brine and using $N_2$, as the gas phase. The brine, surfactant, and polymer are the same as those used in Example 4. The foam qualities range from 81 to 89 per cent. One set of foams is formed by injecting the polymer/surfactant solution and the gas directly into a 120 darcy test sand pack at 22° C. and atmospheric backpressure. The sand pack is 30 cm long and has an inner diameter of 1.0 cm. The sand pack functions as a foam generating device and a model fracture. The second flood is preformed in a 120 darcy foam generating sand pack and then injected into a 120 darcy test sand pack at 3,450 kPa injection pressure and 22° C.

Figure 5:
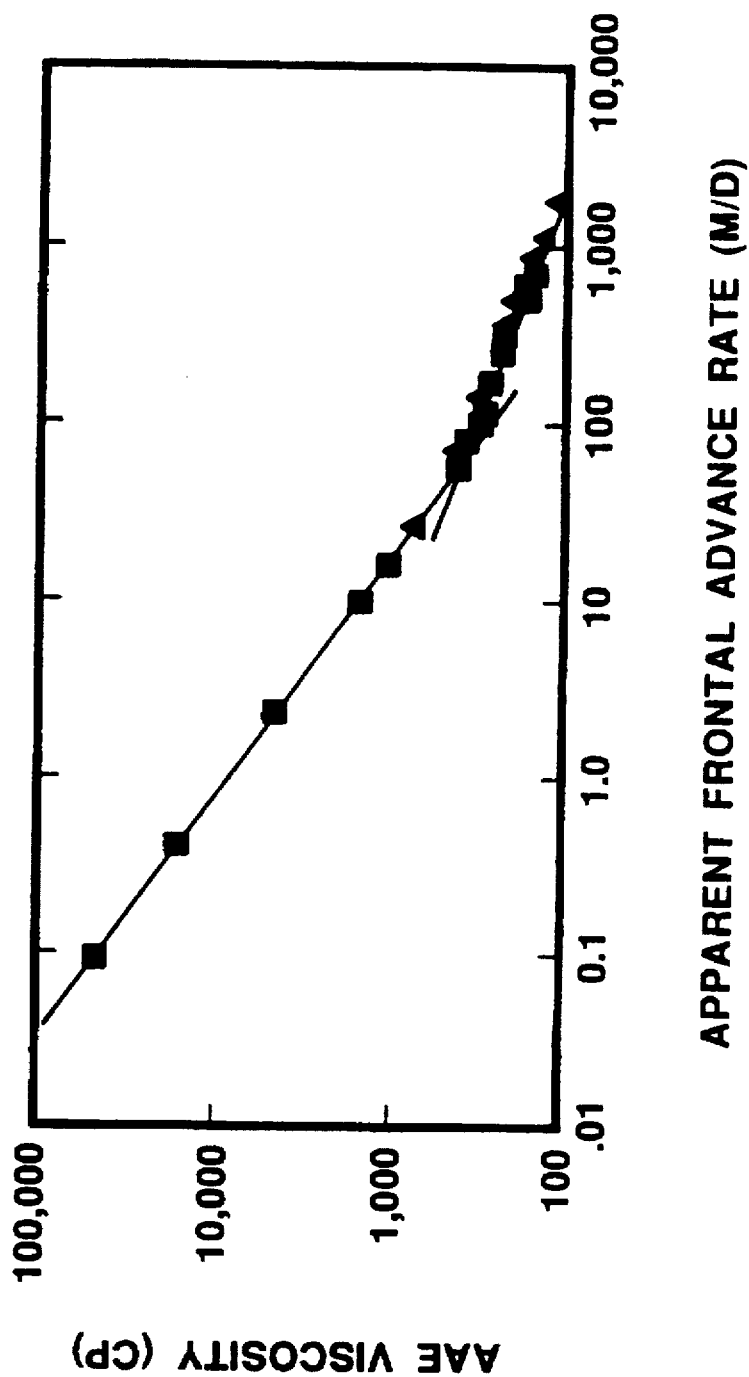
FIG. 5 is a graph showing the average apparent effective viscosity as a function of the apparent frontal advance rate for polymer enhanced foams injected into a sand pack at atmospheric backpressure and at 3,450 kPa injection pressure.

FIG. 5 shows the average apparent effective viscosity as a function of the apparent frontal advance rate for the in-situ-generated foam and the preformed foam. The high pressure data shown in FIG. 5 are comparable to the atmospheric pressure data of Example 5, which are plotted as triangles. These data and the data shown in FIG. 4 (Example 5) indicate that the apparent viscosities of the polymer enhanced foams are nearly independent of pressure. Additionally, it is shown that very large effective viscosities can be attained at low shear rates, and the rheological properties of preformed and in-situ-generated foams are nearly identical.

EXAMPLE 7

Effect of temperature on foam stability

A polymer enhanced foam is prepared using the reservoir brine, containing 2,000 ppm of surfactant, 7,000 ppm of PHPA with a molecular weight of 11,000,000, and $N_2$. The surfactant, polymer, and brine are the same as those used in Example 4. The polymer enhanced foam is generated in a 170 darcy foam generating sand pack at an apparent frontal advance rate of about 1,524 m/day. The sand pack has a length of 30, cm and a diameter of 1.1 cm, and the experiment is conducted at 22° C. and repeated at 51° C. 100 ml of each foam effluent is collected in a stoppered graduated cylinder and aged at 22° C and 51° C., respectively. The foam volumes are observed during the next 24 hours, and the results are shown in Table I. Increasing the temperature from 22° to 51° C. has no significant effect on the stability of the polymer enhanced foam for the first seven hours of aging. In addition, the polymer enhanced foam shows superior stability to that of a conventional foam at 51° C.

As noted during the flooding experiments, the effective viscosity of the foam decreases as the temperature increases. At each temperature, the effective viscosity of the polymer enhanced foam is proportional to the effective viscosity of the polymer solution alone, which is inversely proportional to the temperature.

TABLE I

| Aging Time (hr) | Foam Volume (cm³) 22° C. | Foam Volume (cm³) 51° C. |
|---|---|---|
| 0.25 | 100. | 100. |
| 1.0 | 100. | 100. |
| 2.0 | 97. | 98. |
| 3.0 | 94. | 94. |
| 4.0 | 92.* | 91.** |
| 5.0 | 89.** | 89.** |
| 7.0 | 87.** | 88.** |
| 24.0 | 85.** | 58.** |

*Fragile and light foam
**Extremely fragile and coarse foam

EXAMPLE 8

Effect of polymer concentration

Figure 6:
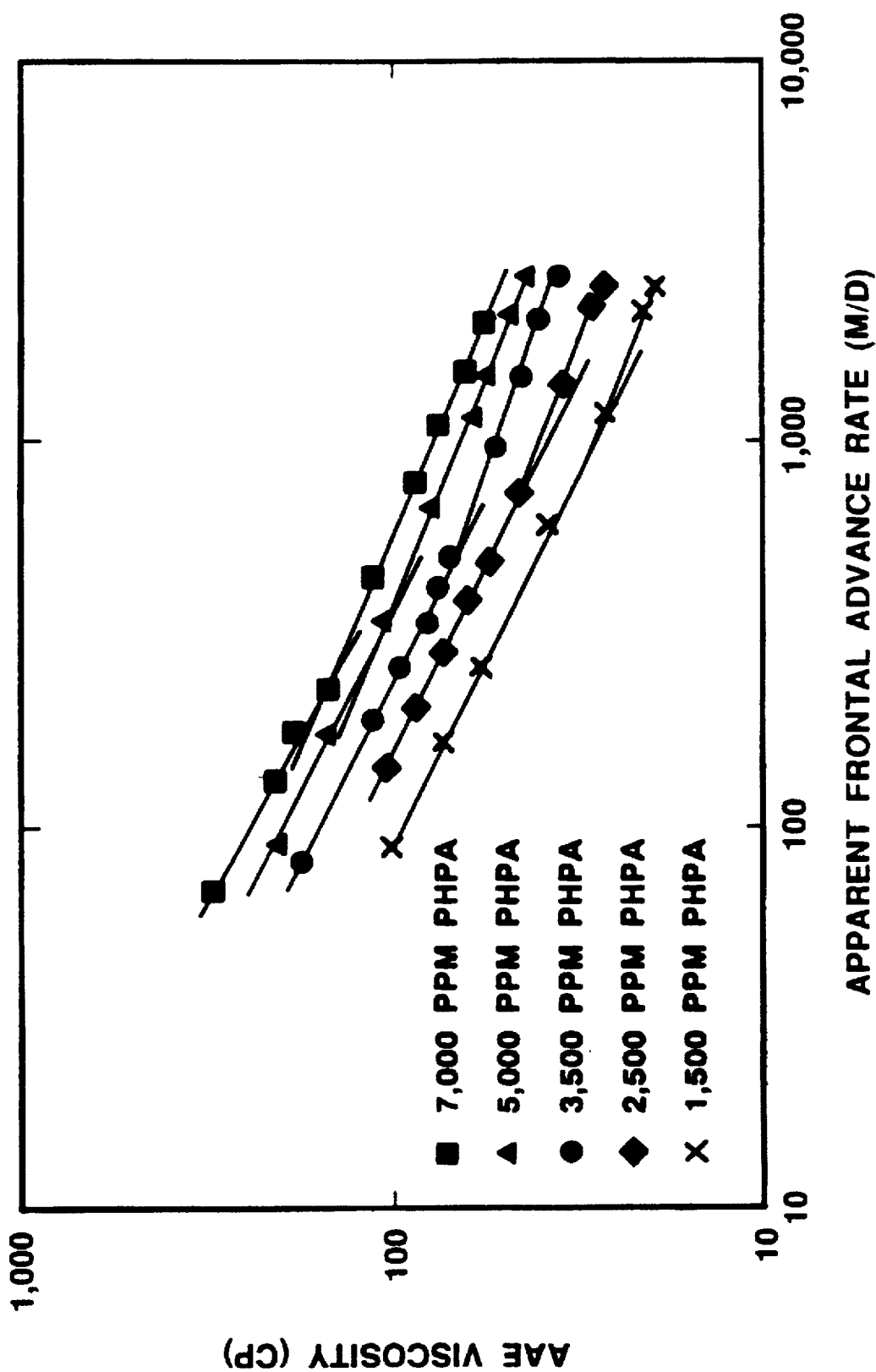
FIG. 6 is a graph showing the average apparent effective viscosities as a function of apparent frontal advance rate in a sand pack for a series of polymer enhanced foams having different polymer concentrations.

Polymer enhanced foams are prepared with $N_2$ and an aqueous phase consisting of 2,000 ppm of an alpha olefin sulfonate surfactant, a reservoir brine, and PHPA concentrations of 1,500; 2,500; 3,500; 5,000; and 7,000 ppm. The brine, surfactant, and PHPA are the same as those of Example 4. The polymer solution viscosities are 50, 280, 800, 3,300 and 4,800 cp, respectively, at a shear rate of 1.0 $sec^{-1}$. The foams are generated in a 140 darcy sand pack with a pressure drop of 138–1,380 kPa and a frontal advance rate of 61–3,048 m/day. The sand pack serves both foam generating and test functions and has a length of 30 cm and a diameter of 1.1 cm. The foam qualities range between 85 and 89 per cent. As shown in FIG. 6, significant viscosities are observed for all polymer concentrations studied, and the average effective viscosity is proportional to the polymer concentration.

EXAMPLE 9

Effect of surfactant concentration

Figure 7:
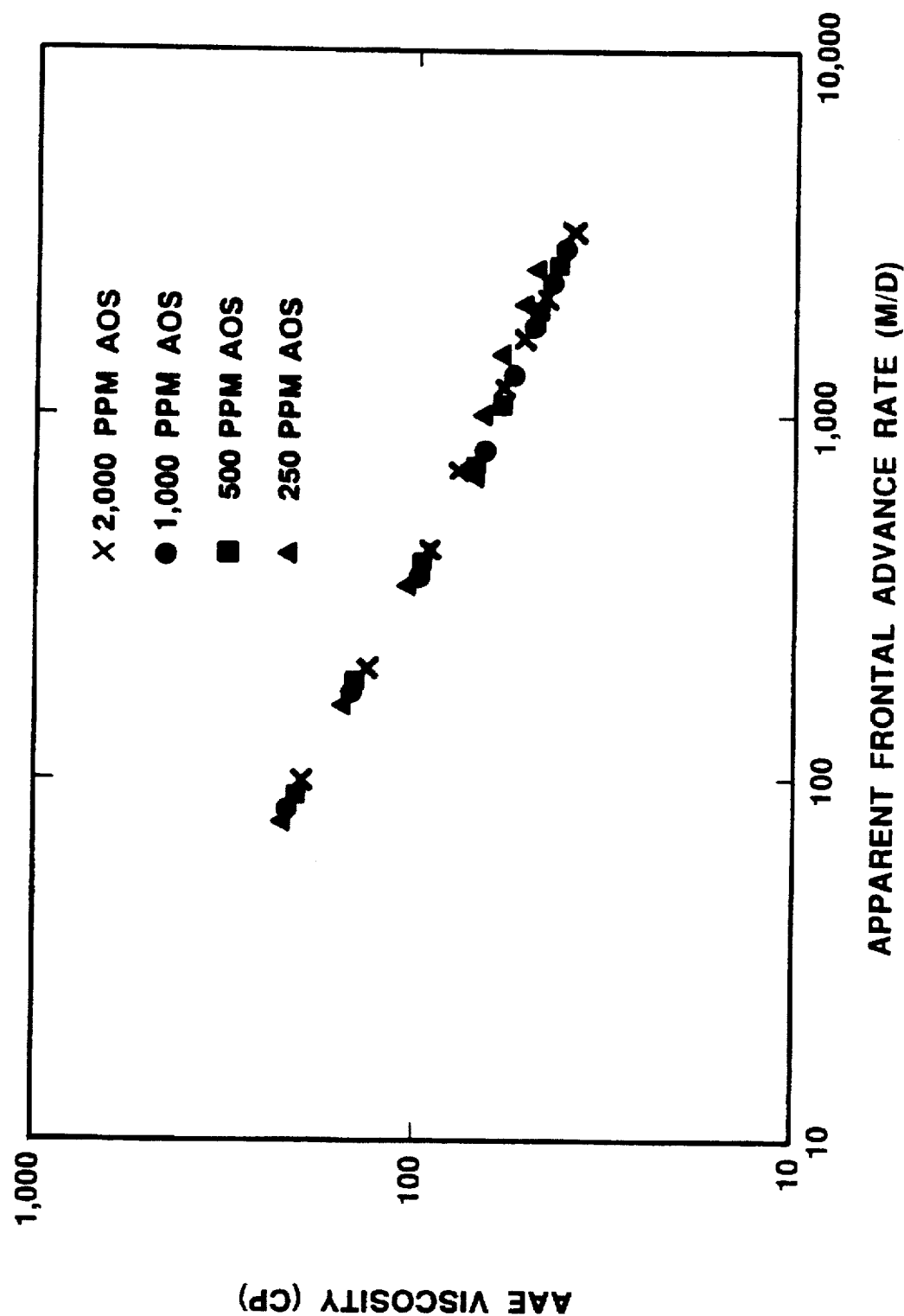
FIG. 7 is a graph showing the average apparent effective viscosities as a function of apparent frontal advance rate in a sand pack for a series of polymer enhanced foams having different surfactant concentrations.

Polymer enhanced foams are prepared using a reservoir brine containing 7,000 ppm of 30% hydrolyzed PHPA having a molecular weight of 11,000,000 and surfactant concentrations of 250 ppm; 500 ppm; 1,000 ppm; and 2,000 ppm. The brine, surfactant (alpha olefin sulfonate, or AOS), and polymer are the same as those used in Example 4. The foams are generated with $N_2$ in a 140 darcy foam generating and test sand pack with a pressure drop of 138–1,380 kPa, and the foam qualities are between 85 and 89 per cent. The sand pack is 30 cm long and has an inner diameter of 1.1 cm. As shown in FIG. 7, the surfactant concentration has little or no effect on polymer enhanced foam viscosity over a broad range of surfactant concentrations. Thus, by using a polymer enhanced foam fracturing fluid, the concentration of surfactant in the foam can be kept relatively low without decreasing the viscosity or changing the foam's rheological properties, thereby reducing the cost of the hydraulic fracture fluid.

EXAMPLE 10

Effect of gas composition

Figure 8:
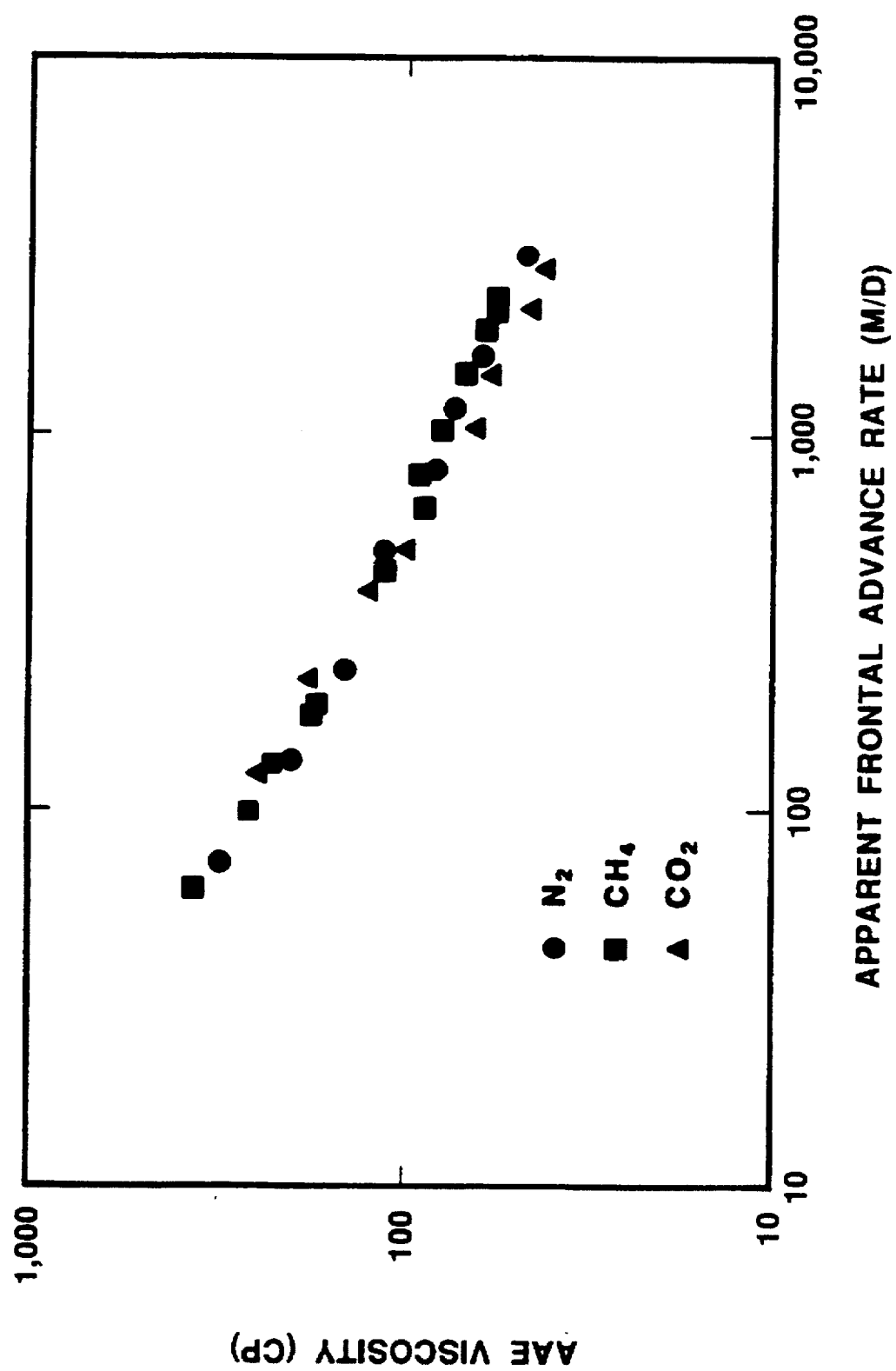
FIG. 8 is a graph showing the average apparent effective viscosities as a function of apparent frontal advance rate in a sand pack for a series of polymer enhanced foams generated with different gases and having similar foam qualities.

Polymer enhanced foams are prepared using 7,000 ppm PHPA and 2,000 ppm Bio-Terge AS-40 surfactant in a reservoir brine and with different gases. The brine, surfactant, and PHPA are the same as those used in Example 4. The solution pH is 7.5. Foam qualities range between 85 and 90 per cent with $N_2$, 85 and 89 per cent with $CH_4$, and 87 and 89 per cent with $CO_2$. Frontal advance rates are observed in a 150 darcy sand pack with a pressure drop between 207 and 1,380 kPa. The polymer enhanced foam performances are very similar with all three gases, as shown in FIG. 8. In particular, the acidity of the $CO_2$ foam had no significant effect on the polymer enhanced foam viscosity performance. Thus, almost any available gas can be utilized as a foaming agent in the fracturing fluid, and the rheological performance of the polymer enhanced foam appears to be insensitive to the gas composition utilized.

EXAMPLE 11

Effect of brine composition

Figure 9:
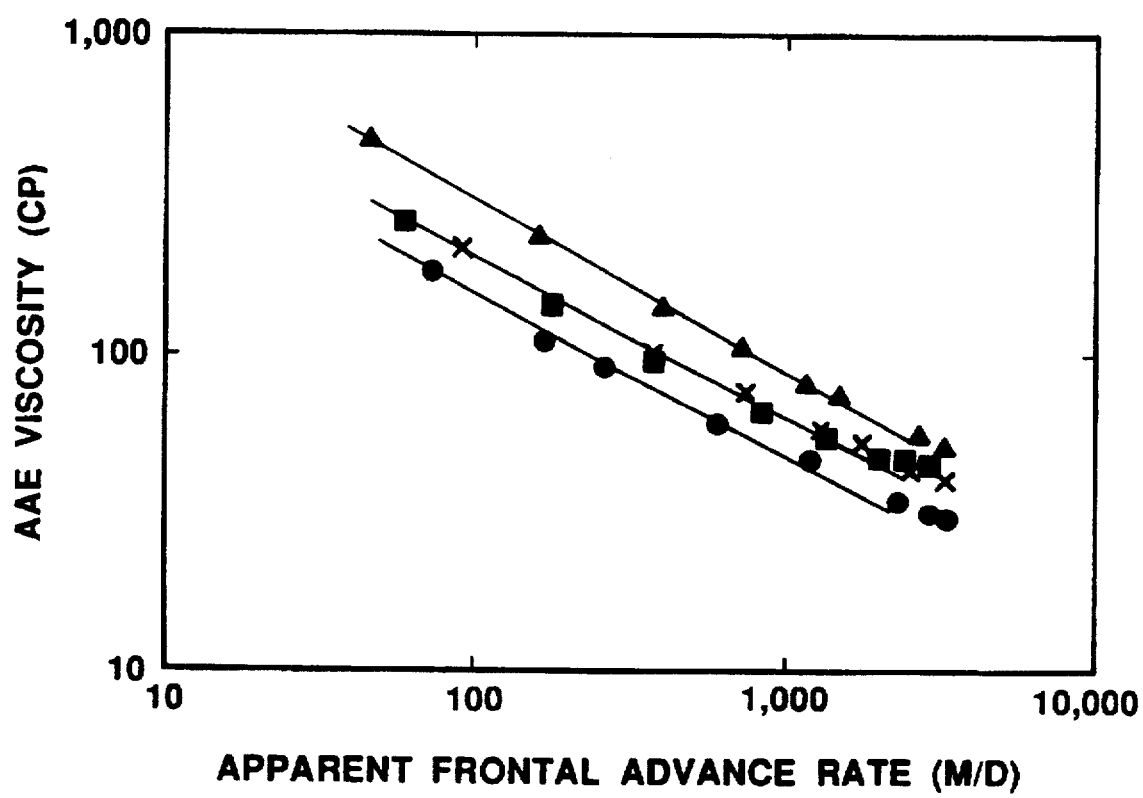
FIG. 9 is a graph showing the average apparent effective viscosities as a function of apparent frontal advance rate in a sand pack for a series of polymer enhanced foams having fresh water and brine solvents and polyacrylamide polymers with different degrees of hydrolysis.

Four polymer enhanced foams are formulated with 30 per cent hydrolyzed PHPA and unhydrolyzed PA, both having molecular weights of 11,000,000, and with fresh water and brine. The brine contains 5,700 ppm total dissolved solids, with high concentrations of $Ca^{2+}$, $Mg^{2+}$, and $SO_4^{2-}$. The polymer concentration in the aqueous phase is 7,000 ppm, the surfactant is Bio-Terge AS-40 at a concentration of 2,000 ppm in the aqueous phase, and the gas is $N_2$. As shown in FIG. 9, for any given apparent frontal advance rate, the effective viscosity of each polymer enhanced foam is proportional to the viscosity of the aqueous polymer solution from which it was formed. As expected for polyacrylamides due to hydrolysis and salinity interactions, the viscosities of polymer solutions with higher salinity are less than the viscosities of fresh water solutions which contain the same polymer concentration. When the brine and fresh water polymer solutions have approximately the same viscosity, the polymer enhanced foams generated with those solutions also have similar viscosities. The percent of hydrolysis of the polymer has the same effect on the rheology of the polymer solution and the polymer enhanced foam, with greater effective viscosities for otherwise identical polymer solutions and polymer enhanced foams containing polymers with higher levels of hydrolysis.

EXAMPLE 12

Effect of polymer molecular weight

Figure 10:
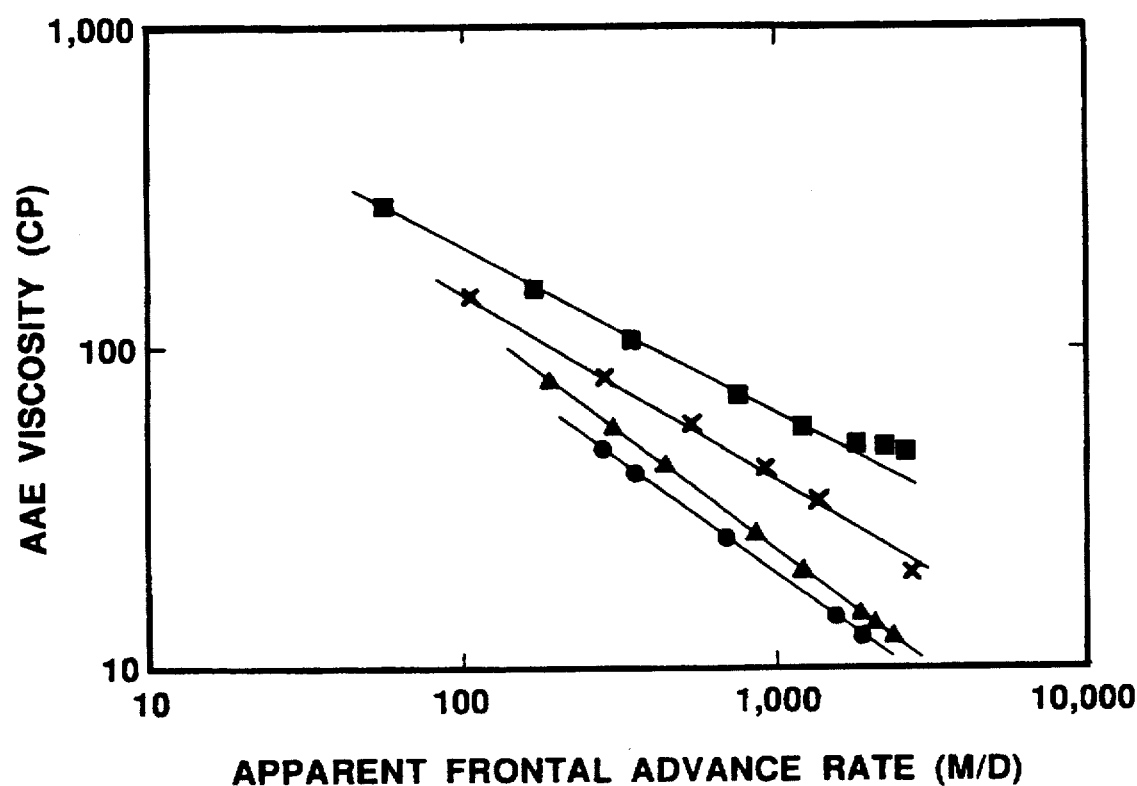
FIG. 10 is a graph showing the average apparent effective viscosities as a function of apparent frontal advance rate in a sand pack for a series of polymer enhanced foams containing polyacrylamide polymers of differing molecular weights.

Polymer enhanced foams are prepared using $N_2$; 2,000 ppm of Bio-Terge AS-40 surfactant in the aqueous phase ("AQ. SOLN."); and unhydrolyzed polyacrylamide concentrations in the aqueous phase and molecular weights as shown in FIG. 10. Increasing the polymer molecular weight increases the viscosity of the polymer solution and the polymer enhanced foam formed from the solution. Further, the viscosity of the aqueous phase from which the polymer enhanced foam is formed controls the effective viscosity of the polymer enhanced foam. Thus, the same viscosity performance can be achieved for a given polymer enhanced foam by increasing the polymer molecular weight and using less polymer in the foam, resulting in significant cost savings.

EXAMPLE 13

Effect of pH

Figure 11:
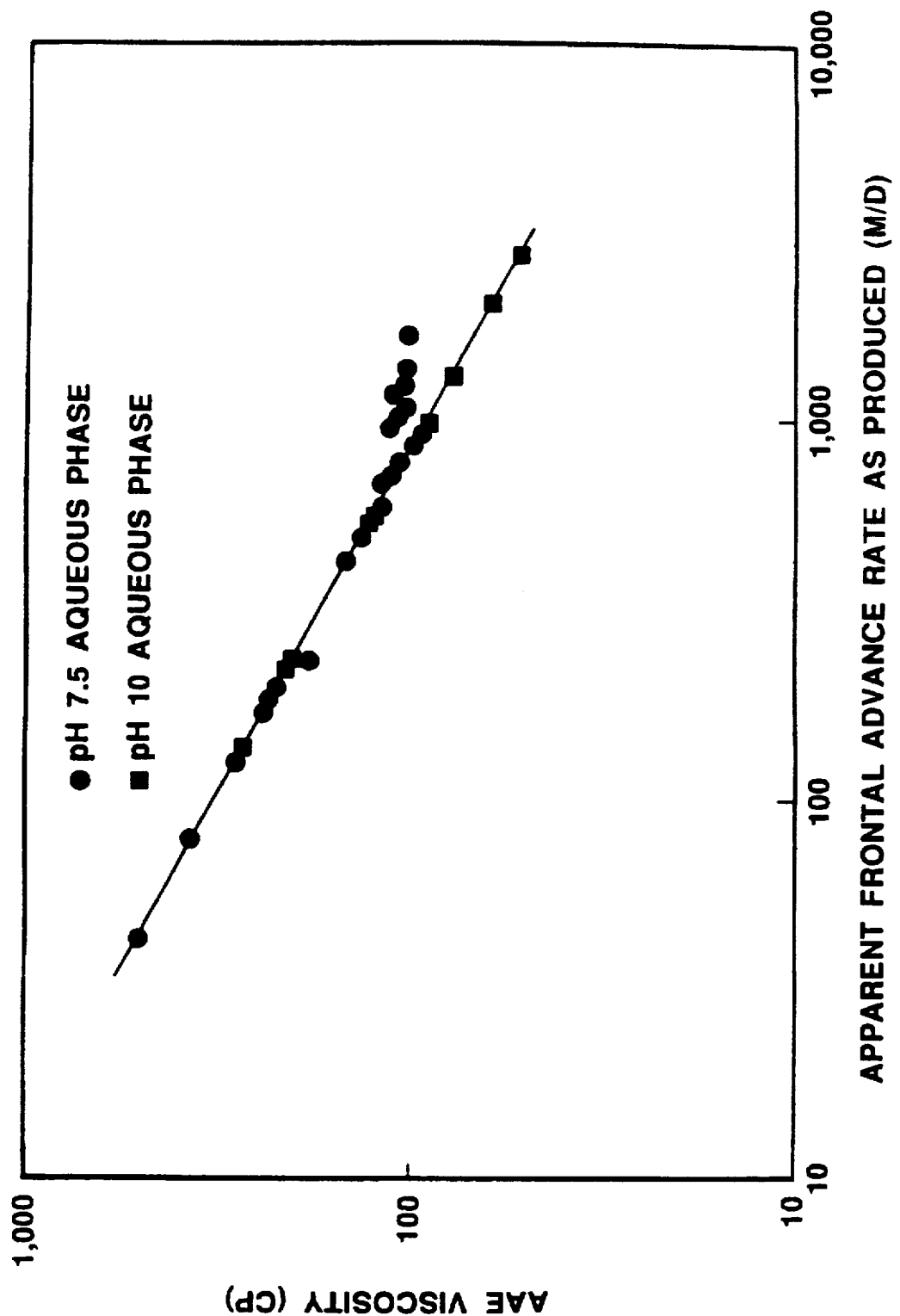
FIG. 11 is a graph showing the average apparent effective viscosities as a function of apparent frontal advance rate in a sand pack for polymer enhanced foams having aqueous phase pH values of 7.5 and 10.

Two brine solutions are prepared having 11,000,000 molecular weight PHPA concentrations of 7,000 ppm and Bio-Terge AS-40 surfactant concentrations of 2,000 ppm. The brine is the same as that used in Example 11, and the PHPA is the same as that used in Example 4. The pH of one solution is adjusted to 7.5, and the pH of the other is adjusted to 10. Polymer enhanced foams are formed with $N_2$ in a 30 cm long combined foam generating and test sand pack having a permeability of 150 darcies. Atmospheric backpressure is maintained, with a pressure drop across the sand pack of 138–1,380 kPa. As shown in FIG. 11, the average effective viscosity and rheological performance of these polymer enhanced foams are essentially independent of the pH over the range studied.

While the foregoing preferred embodiments of the invention have been described and shown, it is understood that alternatives and modifications, such as those suggested and others, may be made thereto and fall within the scope of the present invention.

What is claimed is:

1. A fracturing process applied to a subterranean formation below an earthen surface in fluid communication with a wellbore comprising the steps of:
   (a) forming a solution from an aqueous solvent, a water-soluble synthetic polymer, and a surfactant;
   (b) adjusting the pH of the solution to a value between about 4 and about 10;
   (c) preforming a foamed fracturing fluid at the surface comprising said solution and a gas, the fluid being substantially free of agents which are capable of crosslinking the polymer; and
   (b) injecting said foamed fracturing fluid into said formation via said wellbore at a pressure sufficient to induce at least one fracture in said formation.

2. The process of claim 1 wherein step (b) is performed concurrently with step (c).

3. A fracturing process applied to a subterranean formation below an earthen surface in fluid communication with a wellbore comprising the steps of:
   (a) preforming a foamed fracturing fluid at the surface comprising an aqueous solvent, a water-soluble synthetic polymer, a surfactant, and a gas, the fluid being substantially free of agents which are capable of crosslinking the polymer;
   (b) injecting said fracturing fluid into said formation via said wellbore at a pressure sufficient to induce at least one fracture in said formation; and thereafter,
   (c) mixing a foam breaker with said fracturing fluid.

4. A fracturing process applied to a subterranean formation below an earthen surface in fluid communication with a wellbore comprising the steps of:
   (a) preforming a foamed fracturing fluid at the surface comprising an aqueous solvent, a water-soluble synthetic polymer, a surfactant, a foam breaker, and a gas, the fluid being substantially free of agents which are capable of crosslinking the polymer; and
   (b) injecting said fracturing fluid into said formation via said wellbore at a pressure sufficient to induce at least one fracture in said formation.

5. A fracturing process applied to a subterranean formation below an earthen surface in fluid communication with a wellbore comprising the steps of:
   (a) preforming a foamed fracturing fluid at the surface comprising an aqueous solvent, a water-soluble synthetic polymer, a surfactant, and a gas, wherein the fluid is substantially free of agents which are capable of crosslinking the polymer and wherein said polymer is selected from the group consisting of polyacrylamide; partially hydrolyzed polyacrylamide; acrylamide copolymers; acrylamide terpolymers containing acrylamide, a second species, and a third species; tetrapolymers containing acrylamide, acrylate, a third species, and a fourth species; polyvinyl alcohol; polyethylene oxide; polyvinyl pyrrolidone; and mixtures thereof; and
   (b) injecting said fracturing fluid into said formation via said wellbore at a pressure sufficient to induce at least one fracture in said formation.

6. The process of claim 5 wherein said aqueous solvent, said polymer, and said surfactant can be combined to form a solution having a pH between about 4 and about 10.

7. The process of claim 5 wherein the foamed fracturing fluid is an emulsion.

8. The process of claim 5 wherein said fracturing fluid additionally comprises a proppant.

9. The process of claim 5 wherein said surfactant is selected from the group consisting of ethoxylated alcohols, ethoxylated sulfates, refined sulfonates, petroleum sulfonates, alpha olefin sulfonates, and mixtures thereof.

10. The process of claim 5 wherein said surfactant is present in said aqueous solvent at a concentration between about 20 ppm and about 50,000 ppm.

11. The process of claim 5 wherein said surfactant is present in said aqueous solvent at a concentration between about 50 ppm and about 20,000 ppm.

12. The process of claim 5 wherein said surfactant is present in said aqueous solvent at a concentration between about 1,000 ppm and about 18,000 ppm.

13. The process of claim 5 wherein said gas is selected from the group consisting of nitrogen, air, carbon dioxide, flue gas, produced gas, natural gas, and mixtures thereof.

14. The process of claim 5 wherein said gas is selected from the group consisting of nitrogen, carbon dioxide, and mixtures thereof.

15. The process of claim 5 wherein said fracturing fluid has a gas content between about 30 per cent and about 99 per cent by volume at reservoir temperature and pressure.

16. The process of claim 5 wherein said fracturing fluid has a gas content between about 60 per cent and about 98 per cent by volume at reservoir temperature and pressure.

17. The process of claim 5 wherein said fracturing fluid has a gas content between about 70 per cent and about 97 per cent by volume at reservoir temperature and pressure.

18. The process of claim 5 wherein said acrylamide polymer has a molecular weight between about 10,000 and about 50,000,000.

19. The process of claim 5 wherein said acrylamide polymer has a molecular weight between about 250,000 and about 20,000,000.

20. The process of claim 5 wherein said acrylamide polymer has a molecular weight between about 1,000,000 and about 18,000,000.

21. The process of claim 5 wherein said acrylamide polymer is present in said aqueous solvent in an amount between about 100 ppm and about 80,000 ppm.

22. The process of claim 5 wherein said acrylamide polymer is present in said aqueous solvent in an amount between about 500 ppm and about 12,000 ppm.

23. The process of claim 21 wherein said acrylamide polymer is present in said aqueous solvent in an amount between about 2,000 ppm and about 10,000 ppm.

24. The process of claim 5 wherein said aqueous solvent is selected from the group consisting of fresh water and brine.

25. The process of claim 5 wherein said fracturing fluid is substantially stable in glassware at atmospheric pressure for at least about 6 hours.

26. The process of claim 5 wherein said fracturing fluid is shear thinning.

27. The process of claim 5 wherein said fracturing fluid is capable of rehealing itself.

28. The process of claim 5 wherein said formation is hydrocarbon-bearing.

29. The process of claim 5 wherein said fracturing fluid additionally comprises a solid fluid loss additive.

* * * * *

UNITED STATES PATENT AND TRADEMARK OFFICE
CERTIFICATE OF CORRECTION

PATENT NO.   : 5,711,376
DATED        : January 27, 1998
INVENTOR(S)  : Robert D. Sydansk It is certified that error appears in the above-indentified patent and that said Letters Patent is hereby corrected as shown below:

Col. 3, line 36   : Delete "," following formation and insert --.--.
Col. 3, line 40   : Delete "produdion" and insert --production--.
Col. 5, line 27   : Delete "foam" and insert --foams--.
Col. 6, line 7    : Delete "sclerogliycan" and insert --scleroglycan--.
Col. 7, line 16   : Delete "mere" and insert --more--.
Col. 9, line 50   : Delete "am" and insert --are--.
Col. 10, line 21  : Delete "mere" and insert --more--.
Col. 11, line 62  : Delete "$C_{114-16}$" and insert --$C_{14-16}$--.
Col. 12, line 66  : Delete "$N_2$," and insert --$N_2$--.
Col. 13, line 32  : Delete "30," and insert --30--.
Col. 13, line 66  : Delete "am" and insert --are--.

Signed and Sealed this

Sixth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,711,376
DATED : January 27, 1998
INVENTOR(S) : Robert D. Sydansk

It is certified that error appears in the above-identified patent and that said Letters Patent is hereby corrected as shown below:

Column 16, line 5 delete "(b)" and insert --(d)--.

Column 18, line 5 delete "21" and insert --5--.

Signed and Sealed this

Fifteenth Day of June, 1999

Attest:

Q. TODD DICKINSON

Attesting Officer

Acting Commissioner of Patents and Trademarks